United States Patent
Barton et al.

(10) Patent No.: US 11,159,960 B1
(45) Date of Patent: Oct. 26, 2021

(54) INTER-ACCESS POINT SCHEDULING AND RESOURCE MANAGEMENT SYSTEM FOR DENSE DEPLOYMENTS

(71) Applicant: Cisco Technology, Inc., San Jose, CA (US)

(72) Inventors: Robert E. Barton, Richmond (CA); Vishal Satyendra Desai, San Jose, CA (US); Indermeet Singh Gandhi, Bangalore (IN); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 78 days.

(21) Appl. No.: 16/655,059

(22) Filed: Oct. 16, 2019

(51) Int. Cl.
*H04W 24/02* (2009.01)
*H04W 72/08* (2009.01)
*H04W 56/00* (2009.01)
*H04B 17/318* (2015.01)
*H04W 84/18* (2009.01)

(52) U.S. Cl.
CPC .......... *H04W 24/02* (2013.01); *H04B 17/318* (2015.01); *H04W 56/001* (2013.01); *H04W 72/082* (2013.01); *H04W 84/18* (2013.01)

(58) Field of Classification Search
CPC . H04W 24/02; H04W 56/001; H04W 72/082; H04W 84/18; H04B 17/318
USPC ....................................................... 370/329
See application file for complete search history.

(56) References Cited

U.S. PATENT DOCUMENTS

| 10,051,588 | B2  |   | 8/2018 | Wang et al.     |             |
|------------|-----|---|--------|-----------------|-------------|
| 2014/0192785 | A1 | * | 7/2014 | Gong ............... | H04W 56/001 |
|            |     |   |        |                 | 370/336     |
| 2016/0157195 | A1 | * | 6/2016 | Wang .............. | H04W 56/001 |
|            |     |   |        |                 | 370/350     |
| 2017/0127448 | A1 | * | 5/2017 | Zhou .............. | H04W 74/0816 |
| 2017/0171878 | A1 |   | 6/2017 | Chun et al.     |             |
| 2018/0242394 | A1 | * | 8/2018 | Wong ............. | H04L 1/00   |
| 2019/0090259 | A1 |   | 3/2019 | Oteri et al.    |             |

OTHER PUBLICATIONS

Notification and Transmittal of the International Search Report and Written Opinion issued in International Patent Application No. PCT/US2020/054984 dated Nov. 27, 2020.
Yusuke Tanaka et al. (SonyCorporation) "Discussion on Multi-AP Coordination Type" IEEE 802.11-19/0104r1, Jan. 14, 2019; Piscatawaay, NJ USA; retrieved from the Internet: URL:https://mentor.ieee.org/802.11/dcn/19/11-19-0104-01-Oeht-discussion-on-multi-ap-coordination-type.pptx [retrieved on Jan. 17, 2019] 12 pages.

(Continued)

*Primary Examiner* — William Nealon
(74) *Attorney, Agent, or Firm* — Merchant & Gould P.C.

(57) ABSTRACT

Systems and methods herein can synchronize 802.11ax Uplink (UL) and Downlink (DL) Orthogonal Frequency-Division Multiple Access (OFDMA) schedules between adjacent APs that have overlapping BSSs, which may not be solved by BSS coloring. The method includes several stages. First, the APs detect RF interference from APs with overlapping BSSs. Then, the APs conduct time synchronization between these APs. The various APs can then elect a master scheduler. The master scheduler creates and implements a master schedule between these APs to coordinate use of the radio resource.

10 Claims, 9 Drawing Sheets

(56) References Cited

OTHER PUBLICATIONS

Kome Oteri et al.: "Coordinated Multi-AP Transmission for EHT", IEEE Draft 802.11-19/0071R0, IEEE-SA Mentor, Piscataway, NJ USA; Jan. 13, 2019 (Jan. 13, 2019), pp. 1-11, XP06814770O, Retrieved from the Internet: URL:https://mentor.ieee.org/802.11/dcn/19/ 11-19-0071-O0-0eht-coordinated-multi-ap-tr ansmission-for-eht.pptx (12 pages).

Kiseon Ryu et al.: "Consideration on multi-AP coordination for EHT", IEEE Draft 802. 11-18/1982 RI, IEEE-SA Mentor, Piscataway, NJ USA; No. 1 Jan. 9, 2019 (Jan. 9, 2019), pp. 1-10, XP068147487, Retrieved from the Internet: URL:https://mentor.ieee.org/802.11/dcn/18/ 11-18-1982-01-0eht-consideration-on-multi-ap-coordination-for-eht.pptx.

Kawamura Kenichi et al.: Cooperative control of 802.llax access parameters in high density wireless LAN systems, 2019 IEEE Wireless Communications and Networking Conference (WCNC), IEEE, Apr. 15, 2019 (Apr. 15, 2019), pp. 1-6, XP033651898, DOI: 10.1109/WCNC.2019.8885425 [retrieved on Oct. 28, 2019] (3 pages).

David Lopez-Perez et al. (Nokia): Coordinated Beamforming/Null Steering Protocol in 802. llbe 11 , IEEE Draft; 11-19-1594-02-00BE-Coordinated-Beamforming-Null-Steering-Protocol-IN-802-IIBE, IEEE-SA Mentor, Piscataway, NJ USA; vol. 802.11 EHT; 802.llbe, No. 2 Oct. 10, 2019 (Oct. 10, 2019), XP068154086, Retrieved from the Internet: URL:https://mentor.ieee.org/802.11/dcn/19/ 11-19-1594-02-00be-coordiriated-beamforming -null-steering-protocol-in-802-llbe.pptx [retrieved on Oct. 10, 2019].

\* cited by examiner

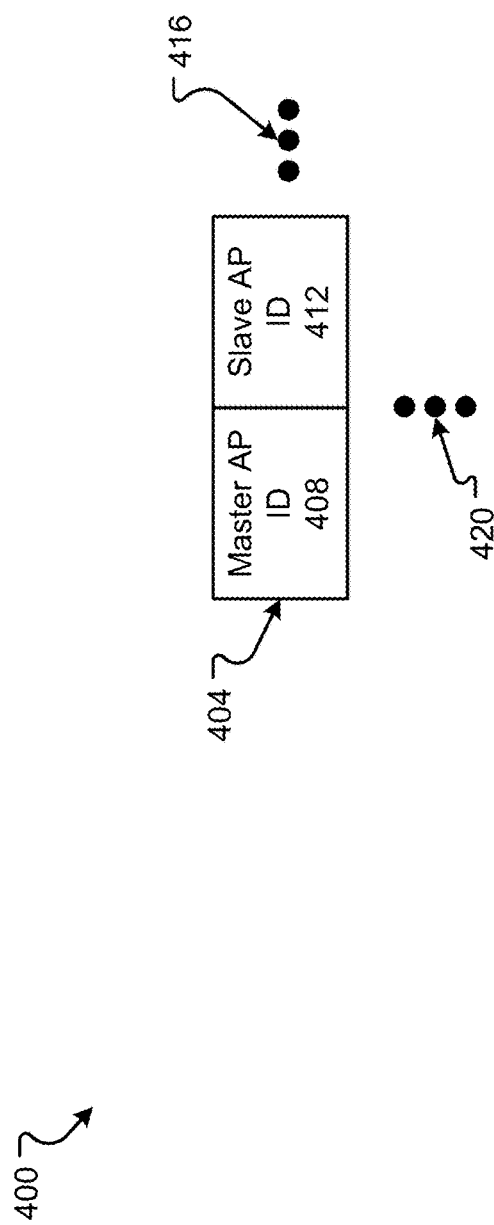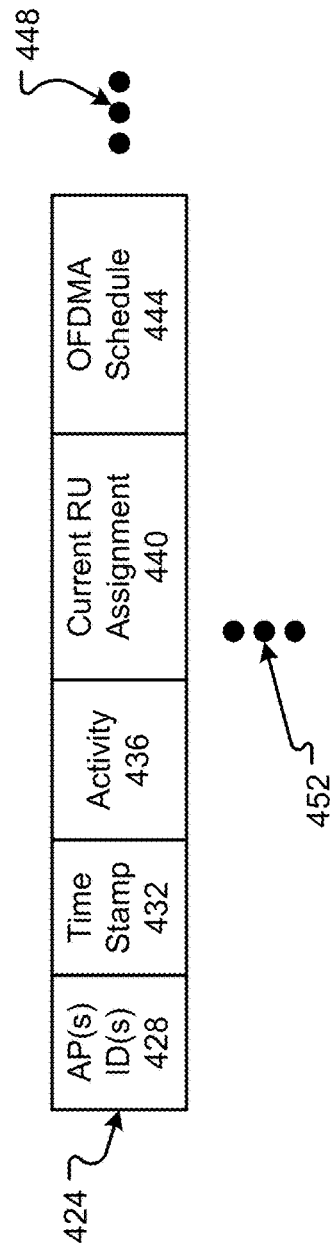
Fig. 4A
Fig. 4B

US 11,159,960 B1

INTER-ACCESS POINT SCHEDULING AND RESOURCE MANAGEMENT SYSTEM FOR DENSE DEPLOYMENTS

TECHNICAL FIELD

An exemplary aspect is directed toward communications systems. More specifically an exemplary aspect is directed toward IEEE (Institute of Electrical and Electronics Engineers) 802.11 wireless communications systems.

BACKGROUND

Wireless systems employ processes to manage the radio resources of the wireless devices to optimize parameters including channelization, transmit power, etc. The management of the radio helps avoid or mitigate issues with signal interference. The processes to manage the radio resource can be executed on a controller that may manage the Access Points (APs) that are either joined to the same controller or joined to another controller belonging to the same Radio Frequency (RF) group. Thus, any APs not part of the same deployment or controlled together may not be optimized to work together.

Overlapping BSSs is a known and common challenge in Wi-Fi networks. This situation can occur frequently in the 2.4 GHz band and the wider 5 GHz channels, where 80 MHz and 160 MHz-wide channels can be found. BSS coloring or identification was introduced in 802.11ax to help mitigate problems with overlapping BSSs, however, this change only attempts to keep Stations (STAs) of different colors from contending for access to the same medium. Yet, APs in overlapping BSSs are still a source of Radio Frequency (RF) interference and thus cause collisions. Therefore, even with BSS coloring, co-channel RF interference issues still exist, making it difficult to deploy many APs in the 2.4 GHz spectrum or when using wider channels of the 5 GHz spectrum.

These above scenarios present challenges in radio resource optimization.

SUMMARY

Aspects herein can comprise systems and methods comprising receiving, at a first Access Point (AP) of a first Basic Service Set (BSS), a signal from a second AP of a second BSS. The first AP can then determine a Received Signal Strength Indicator (RSSI) associated with the second AP to determine if there is interference from the second AP. When there is interference, the first AP may generate a joint schedule for the first AP and the second AP to manage how the first AP and second AP transmit or receive signals to mitigate the interference.

BRIEF DESCRIPTION OF THE FIGURES

FIG. 4A illustrates data structure that may be received, stored, retrieved, managed, etc., in accordance with aspects of the current disclosure;

FIG. 4B illustrates another data structure that may be received, stored, retrieved, managed, etc., in accordance with aspects of the current disclosure;

Figure 1A:
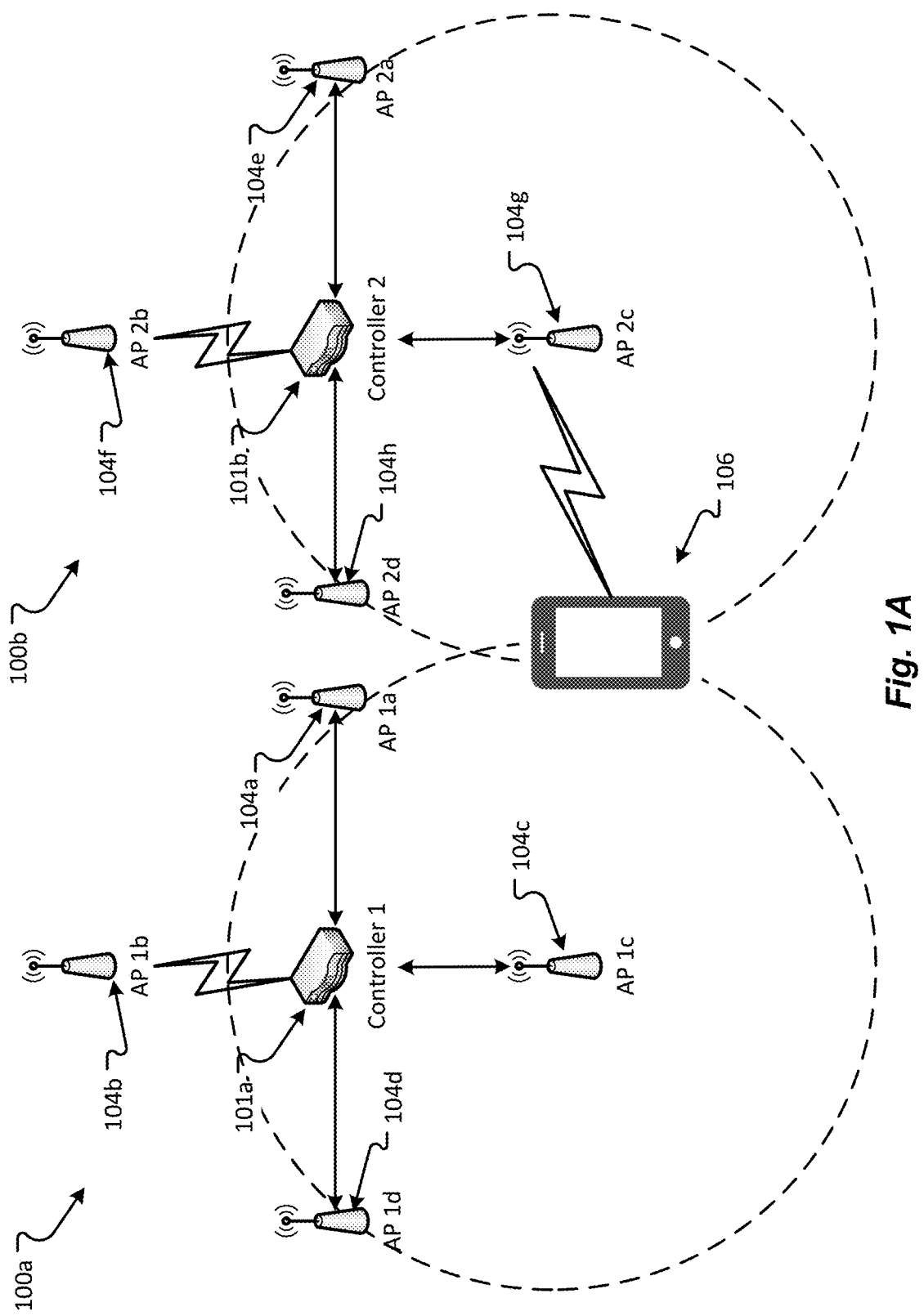
FIG. 1A illustrates an environment having two basic service sets in accordance with aspects of the current disclosure.

In the drawings, like numerals can refer to like components. A letter following the numeral indicates another instance of the same type of component. Like components can share the description of that component. When referring to a component without the letter following the numeral, all components having that numeral indicator may share that description.

DETAILED DESCRIPTION

Overview

Aspects herein comprise system and methods to synchronize 802.11ax Uplink (UL) and Downlink (DL) Orthogonal Frequency-Division Multiple Access (OFDMA) schedules between adjacent APs that have overlapping BSSs, which may not be solved by BSS coloring. The method includes several stages. First, the APs detect RF interference from APs with overlapping BSSs. Then, the APs conduct time synchronization between these APs. The various APs can then elect a master scheduler. The master scheduler creates and implements a master schedule between these APs to coordinate use of the radio resource.

In the first stage mentioned above, an AP can detect frames from STAs or other APs from a nearby, overlapping BSSs. The AP observes the level of RF interference (by determining Received Signal Strength Indicator (RSSI) levels of the Overlapping BSS (OBSS) STAs and APs). Then, the AP can determine whether collisions are being caused by the OBSS devices.

In the second stage described above, once detected, the AP may communicate with the other AP(s) on the same BSS and can agree to synchronize the OFDMA Scheduling and Resource Allocation (SRA) mechanisms across the APs in the same BSS and the OBSS. This agreement may be a handshake process. Once the handshake agreement is made between the OBSS APs, the APs can initiate an IEEE 1588 Precision Time Protocol (PTP) to ensure the system clocks are synchronized across the APs. Clock synchronization is important because the schedule generated relies on precise timing of the inter-AP OFDMA scheduling.

Then, in stage three mentioned above, the APs can elect an OFDMA Scheduling Master, and the other APs become slaves. The selection of the master AP can be accomplished through various methods or processes, and could even be selected at random.

Finally, in stage 4, the Scheduling Master examines various factors affecting the APs in the OBSS and in the same BSS. For example, the Scheduling Master can evaluate the client activity, current RU assignments, and the OFDMA schedule across all OBSS APs. Based on each AP's activity level, the Scheduling Master can attempt to assign non-overlapping Resource Units (RUs) across the OBSS APs. This assignment schedule is done to synchronize RU use across the OBSSs to limit the amount of interference. The Scheduling Master continually monitors the activity level and may reassign RU blocks to different APs as necessary. If non-overlapping RU space is not available across these APs, the Scheduling Master may initiate a synchronized Inter-AP UL and DL transmission schedule for each AP (to ensure both AP and STA transmissions do not interfere with each other). Once the schedule is created on the Scheduling Master, the schedule is published to the slave APs and can be implemented. It should be noted that the schedule can be generated on a controller instead of an AP. Further, the Scheduling Master does not directly control the other APs. Rather, the Scheduling Master can create a time synchronized schedule and publishes that schedule to the Slave APs for them to use, if desired.

For DL communication, each AP's transmission schedule or spatial stream use can be orchestrated by the Scheduling Master to mitigate interference. For at least some UL communications, a Trigger Frame (TF) schedule is used such that UL transmissions are slightly offset from each other to avoid interference. The Scheduling Master can also monitor multi-path interference and adjusts the guard band to the shortest possible duration to keep performance as high as possible. Furthermore, based on station proximity, if OBSS APs operate on different BSS Colors, then specific stations can be configured with a more aggressive OBSS Preamble Detection (OBSS_PD) Minimum and Maximum range. For example, stations with better Signal to Noise Ratio (SiNR) would can use an aggressive OBSS_PD Minimum compared to stations that are at the edge of the BSS.

Aspects herein are generally directed to wireless communications systems that can perform according to one or more wireless communications standards. For example, some aspects may involve wireless communications performed according to Wi-Fi standards developed by the IEEE 802.11, for example, may involve wireless communications performed in accordance with IEEE 802.11ax. Some aspects may involve wireless communications performed in accordance with other standards, rules, regulations, guidance, etc. Some aspects may additionally or alternatively involve wireless communications according to one or more other wireless communication standards, for example, and without limitation, other IEEE wireless communication standards, such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, Machine-Type Communications (MTC) standards such as those embodied in 3GPP Technical Report (TR) 23.887, 3GPP Technical Specification (TS) 22.368, and/or 3GPP TS 23.682, and/or Near-Field Communication (NFC) standards such as standards developed by the NFC Forum, including any predecessors, revisions, progeny, and/or variants of any of the above.

Likewise, some aspects may involve wireless communications performed according to one or more broadband wireless communication standards, for example, 3rd Generation Partnership Project (3GPP), 3GPP Long Term Evolution (LTE), and/or 3GPP LTE-Advanced (LTE-A) technologies and/or standards. Additional examples of broadband wireless communication technologies/standards may include Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1.times.RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards.

Example Embodiments

Figure 1B:
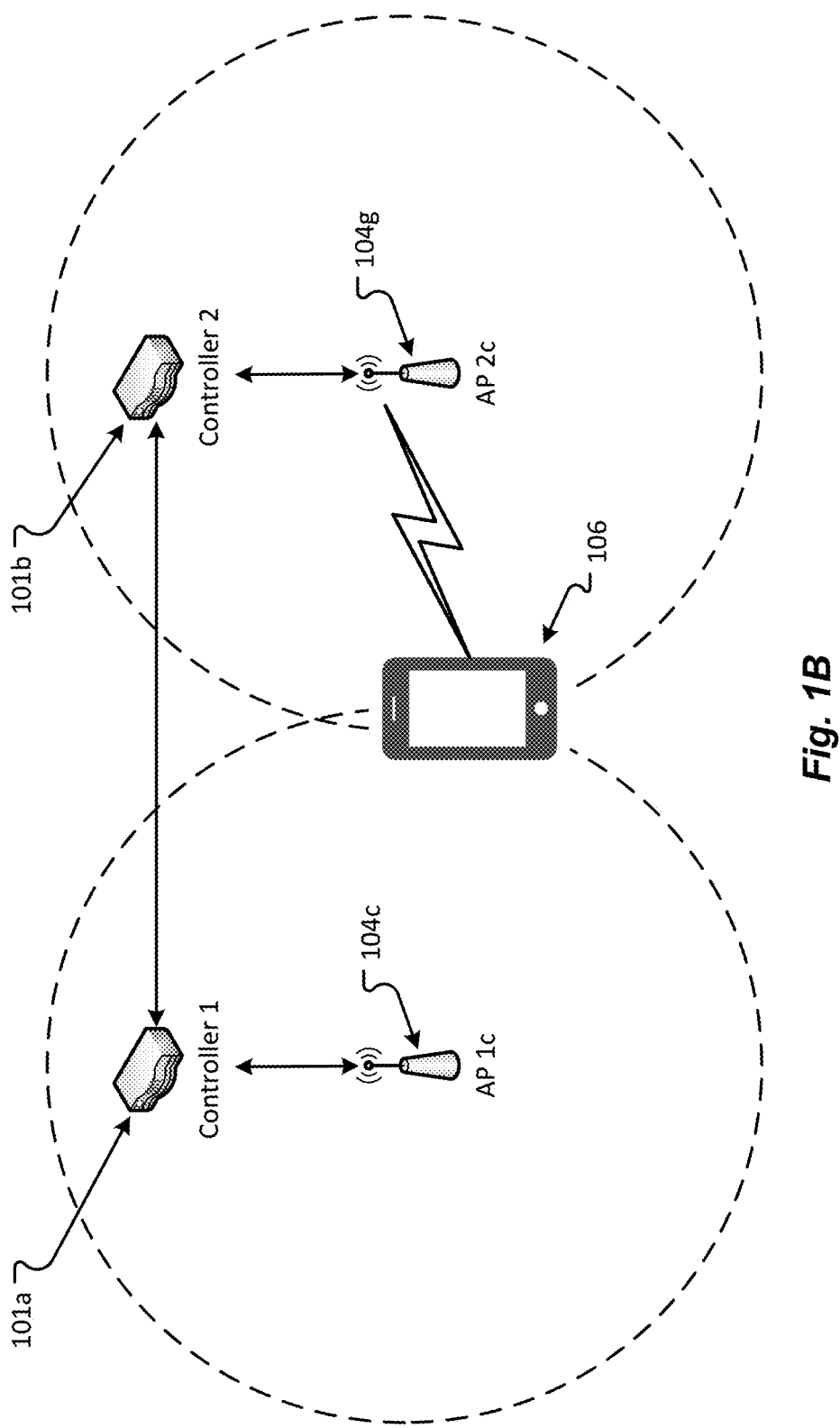
FIG. 1B illustrates an environment with controllers from two BSSs that can help manage assignments to the radio resource in accordance with aspects of the current disclosure.

FIGS. 1A and 1B illustrate an example of an operating environment associated with aspects herein. The WLANs may comprise a basic service set (BSS) 100*a*, 100*b* that may include a master station or controller 101*a*, 101*b*, one or more APs 104*a*-104*h*, and one or more devices or stations (STAs) 106. The master station 101*a*, 101*b* may be an AP using the IEEE 802.11 protocol(s) to transmit and receive. Hereinafter, the term AP will be used to identify the controller 101, but the configurations may not be limited to the AP performing the functions described herein as a separate controller may also perform the functions.

Figure 6:
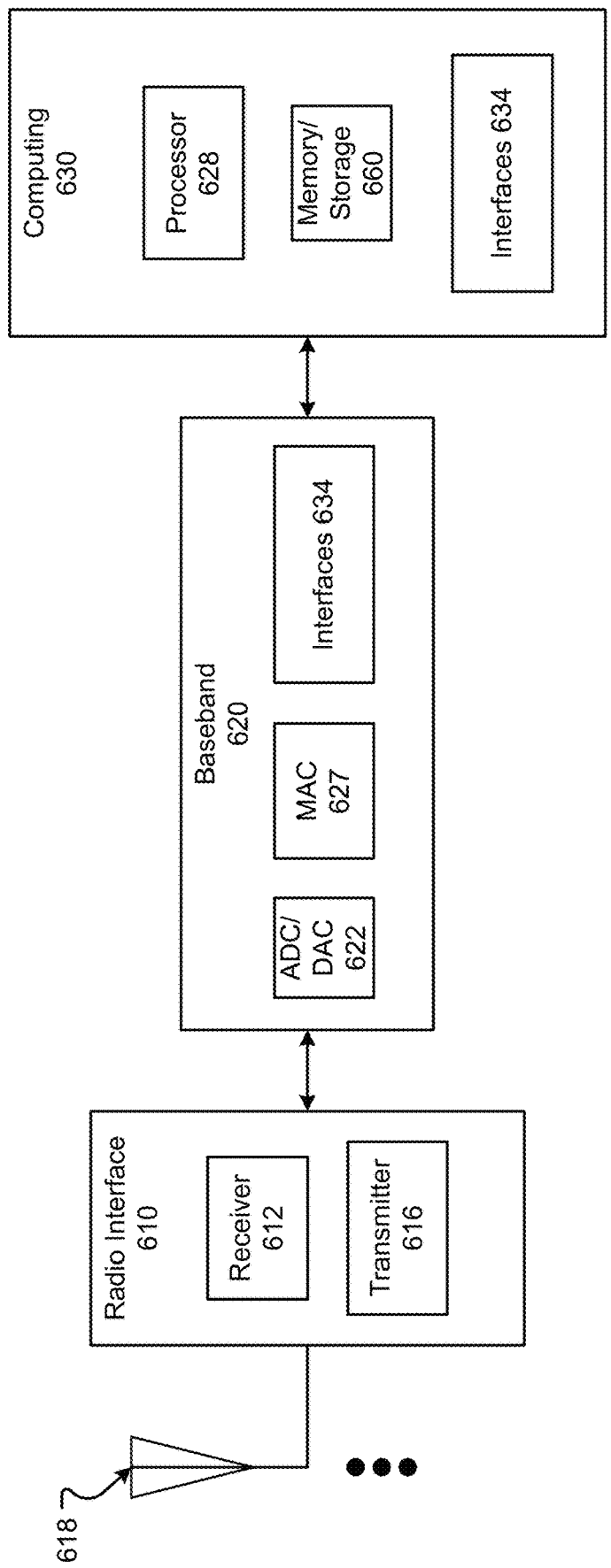
FIG. 6 illustrates an embodiment of a station or access point in accordance with aspects of the current disclosure.

The AP 104 may be a base station and may use other communications protocols as well as the IEEE 802.11 protocol. The IEEE 802.11 protocol may include using OFDMA, Time Division Multiple Access (TDMA), and/or code division multiple access (CDMA). The IEEE 802.11 protocol may include a multiple access technique. For example, the IEEE 802.11 protocol may include Space-Division Multiple Access (SDMA) and/or Multiple-User Multiple-Input Multiple-Output (MU-MIMO). An example configuration of the APs 104 and/or controllers 101 may be as shown in FIG. 6.

The STAs 106 may include one or more High-Efficiency Wireless (HEW) (as illustrated in, e.g., the IEEE 802.11ax standard) STAs, future defined types of STAs, and/or one or more legacy (as illustrated in, e.g., the IEEE 802.11n/ac standards) STAs. The STAs 106 may be wireless devices, for example, a cellular telephone, a smart telephone, a handheld wireless device, wireless glasses, a wireless watch, a wireless personal device, a tablet, or another device that may be transmitting and receiving using an IEEE 802.11 protocol. In the operating environment, an AP 104 may generally manage access to the wireless medium in the WLAN for the STA 106.

Within the environment including the two BSSs 100, one or more STAs 106 may associate and/or communicate with the AP 104 to join the WLAN. Joining the WLAN may enable STAs 106 to wirelessly communicate with each other via AP 104, with each other directly, with the AP 104, or to another network or resource through the AP 104. In some configurations, to send data to a recipient, a sending STA may transmit an Uplink (UL) Physical Layer Convergence Procedure (PLCP) Protocol Data Unit (PPDU) comprising the data, to AP 104, which may then send the data to the recipient STA 106, in a Downlink (DL) PPDU. The PLCP is the physical layer protocol that is used with 802.11 and other standards.

In some configurations, a frame of data transmitted between the STAs 106 or between a STA 106 and the AP 104 may be configurable. For example, a channel used for communication may be divided into subchannels that may be 20 MHz, 40 MHz, or 80 MHz, 160 MHz, of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz 10 MHz bandwidths, a combination thereof, or any other bandwidth division that is less or equal to the available bandwidth may also be used. The bandwidth of the subchannels may be based on a number of active subcarriers. The bandwidth of the subchannels can be multiples of 26 (e.g., 26, 52, 106, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT); however, other combinations are possible and using 256 tones in a 20 MHz subchannel is not necessary to execute the methods herein.

When managing access to the wireless medium in the WLAN 103, the AP 104 may schedule medium access, for the sending STA 106*b*, during a UL time interval, during which the AP 104 may refrain from transmitting over the wireless medium. The UL time interval may comprise a portion of a Transmit Opportunity (TXOP) owned by AP 104.

At a given point in time, multiple STAs, in the WLAN, may wish to send data. In some configurations, rather than scheduling medium access for STAs 106 in different respective UL time intervals, the AP 104 may schedule medium access for STAs 106 to support UL MU transmission techniques, according to which multiple STAs 106 may transmit UL MU PPDUs to the AP 104 simultaneously during a given UL time interval. For example, by using UL MU OFDMA techniques during a given UL time interval, multiple STAs 106 may transmit UL MU PPDUs to the AP 104 via different respective OFDMA Resource Units (RUs) allocated by the AP 104. In another example, by using UL MU-MIMO techniques during a given UL time interval, multiple STAs 106 may transmit UL MU PPDUs to the AP 104 via different respective spatial streams allocated by the AP 104.

To manage access, the AP 104 may transmit a master-sync transmission, which may be a Trigger Frame (TF) or a control and schedule transmission, at the beginning of the control period. The AP 104 may transmit a time duration of the TXOP and sub-channel information. During the control period, STAs 106 may communicate with the AP 104 in accordance with a non-contention based multiple access technique, such as OFDMA or MU-MIMO. This technique is unlike conventional WLAN communications in which devices communicate in accordance with a contention-based communication technique, rather than a multiple access technique. During the control period, the AP 104 may communicate with stations 106 using one or more control frames, and the STAs 106 may operate on a sub-channel smaller than the operating range of the AP 104.

During the master-sync transmission, the STAs 106 may contend for the wireless medium with the legacy devices 106 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, a Frequency Division Multiple Access (FDMA) technique, or a SDMA technique.

Similarly, STAs, in the WLAN, may need to receive data. Again, rather than scheduling medium access for STAs 106 in different respective DL time intervals, the AP 104 may schedule medium access for STAs 106 to support DL MU transmission techniques, according to which multiple STAs 106 may receive DL MU PPDUs from the AP 104 simultaneously during a given DL time interval. For example, by using DL MU OFDMA techniques during a given UL time interval, multiple STAs 106 may receive DL MU PPDUs from the AP 104 via different respective OFDMA RUs allocated by the AP 104. In another example, by using DL MU-MIMO techniques during a given DL time interval, multiple STAs 106 may receive DL MU PPDUs from the AP 104 via different respective spatial streams allocated by the AP 104.

To manage access, the AP 104 may transmit a master-sync transmission, which may be a TF or a control and schedule reception, at the beginning of the control period. The AP 104 may transmit a time duration of the Receive Opportunity (RXOP) and sub-channel information. During the control period, STAs 106 may communicate with the AP 104 in accordance with a non-contention based multiple access technique, such as OFDMA or MU-MIMO. During the control period, the AP 104 may communicate with stations 106 using one or more control frames, and the STAs 106 may operate on a sub-channel smaller than the operating range of the AP 104.

During the master-sync transmission, the STAs 106 may contend for the wireless medium with the legacy devices 106 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, FDMA technique, or a SDMA technique.

The AP 104 may also communicate with legacy stations and/or stations 106 in accordance with legacy IEEE 802.11 communication techniques. In some configurations, the AP 104 may also be configurable to communicate with stations 106 outside the control period in accordance with legacy IEEE 802.11 communication techniques, although this is not a requirement.

As shown in FIG. 1B, the scheduling of the radio medium can be affected by the presence of another AP 104 that is part of another BSS 100. A STA 106 can be associated with BSS 100*b* and communicating with AP 2c 104*g*. If both AP 1c 104*c* and AP 2c 104*g* are sending signals on the same RUs at the same time, then the STA 106 may experience collisions or interference that prevents the successful reception of a signal from AP 2c 104*g*. Thus, controller 1 101*a* and controller 2 101*b* can effect a master/slave relationship to schedule the medium for the APs 104.

Figure 2:
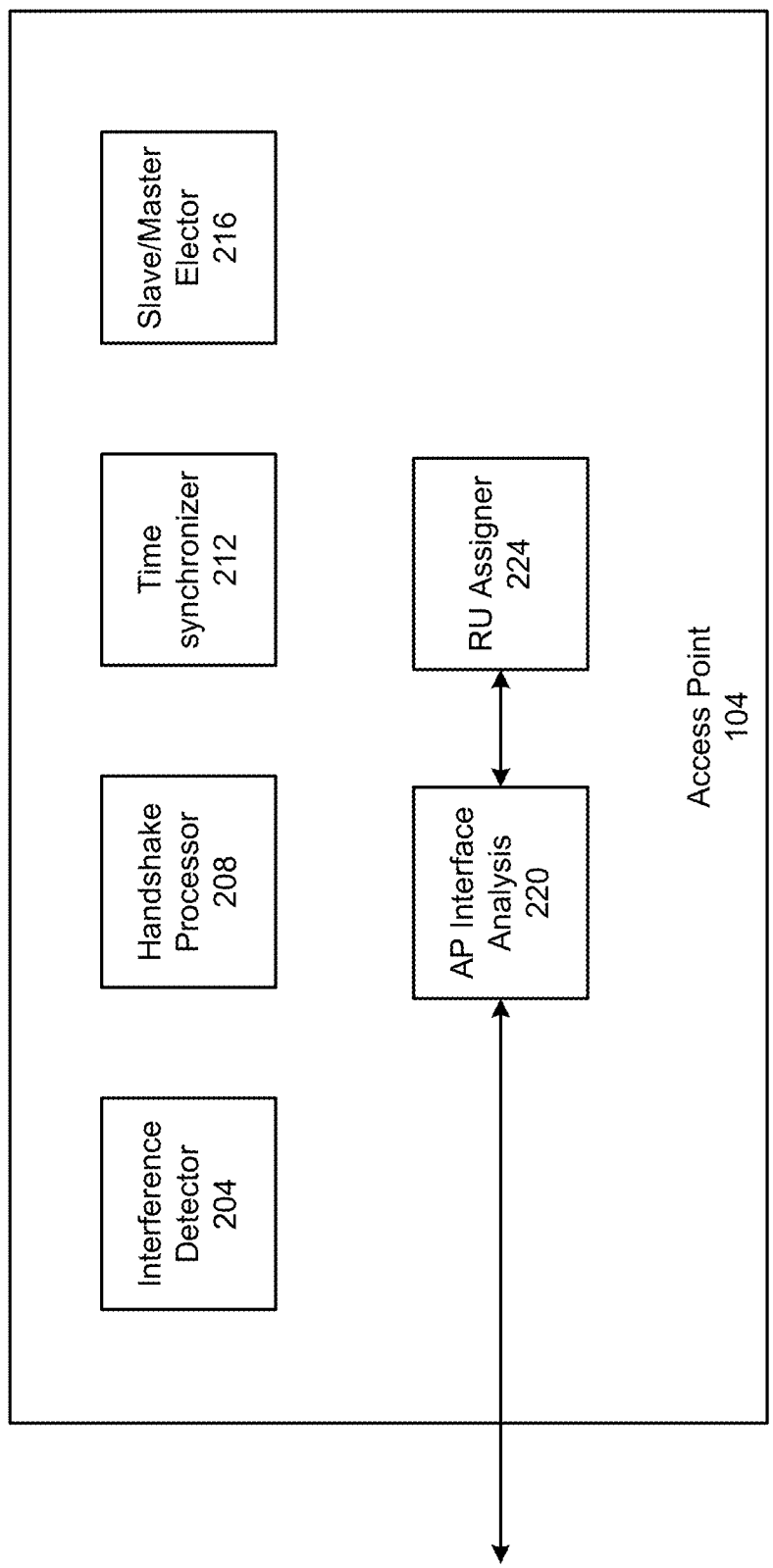
FIG. 2 illustrates an access point in accordance with aspects of the current disclosure.

A configuration of an AP 104 may be as shown in FIG. 2. The AP 104 can include one or more of, but is not limited to, an interference detector 204, a handshake processor 208, a time synchronizer 212, a slave/master elector 216, an AP interface and analysis component 220, and/or a resource unit (RU) assigner 224. There may be more or fewer components than that shown in FIG. 2.

Interference detector 204 is operable to detect signals being received from other access points 104 or stations 106. The interference detector 204 looks for overlapping basic service sets. Thus, the interference detector 204 observes the level of RU interference based on the received signal strength indicator (RSSI) levels from other APs 104 associated with other BSSs 100. The level of interference is determined by the interference detector 204 to determine whether collisions may be caused by the other AP 104 at the station 106. If interference is detected or determined to be a problem, an indication of this interference may be sent to the handshake processor 208.

The handshake processor 208 is operable to communicate with one or more of the other APs 104 and the other BSS 100*b* to communicate a handshake or an agreement to synchronize the OFDMA schedule and resource allocation (SRA) mechanisms across the two APs. The handshake can also include the one or more APs 104 in BSS 100*a*. The handshake process can be an exchange of signals where the agreement is made to coordinate schedule and may be as described in FIG. 3.

The time synchronizer 212 can cause synchronization of the clocks across the two or more APs 104*a*. 104*b*. Time synchronizer 212 thus can send time synchronization information, for example, initiating an IEEE 1588 precision time protocol (PTP) process. Clock synchronization is necessary to allow for the inter-AP and inter-BSS OFDMA scheduling. In this way, the schedule sent from the master to the slave APs 104 may start at a time agreed to and adhered to by the various APs 104 of the different BSSs 100*a*, 100*b*.

A slave/master elector 216 is operable to determine which of the APs 104 among the BSSs 100*a*, 100*b* should be the master to determine the RU assignments in OFDMA schedule. The slave/master elector 216, thus, can communicate signals about the master selection or decide which AP 104 shall be master. For example, a first AP 104 can communicate an assertion to become the master and then may be selected as master by the other APs 104. Other processes or functions may be used to determine the master among the APs 104 and the BSSs 100*a*, 100*b*. If the AP 104 is not a master, the AP 104 will set itself as a slave to the master to receive and possibly adhere to the schedule received from the master AP 104.

The AP interface/analysis component 220 is operable to receive information from various APs 104 either in BSS 1 100*a*, or BSS 2 100*b*. This information may be as described in conjunction with data structure 424 of the FIG. 4B. The information may be received or queried from the various APs 104. Analysis maybe done then to determine which APs 104 are busy, which are transmitting or receiving, etc. From this information, a set of data for how the APs 104 in the two BSSs 100*a*, 100*b* are processing data may be formed and sent to the RU assignor 224.

The resource unit assignor 224 can decide which RUs to assign to which APs 104 based on the analysis received from AP interface analysis component 220. The RU assignor 224 can determine which APs will transmit or receive data on which RUs and at which times to avoid interference between the various different APs 104 in the BSSs 100*a*, 100*b*. It is possible that the RU assignor 224 can generate an OFDMA schedule for one or more of the slave APs 104. It is possible for the RU assignor 224 to send one OFDMA schedule to one slave AP 104 and send a different OFDMA schedule to a different slave AP 104; thus, the OFDMA schedule may be customized for each AP 104. In some situations, if two APs 104 do not interfere with each other, those two APs 104 may share the same resource unit. Regardless, the RU assignor 224 generates the OFDMA schedule that may be transmitted and include information as described in data structure 456 described in conjunction with FIG. 4C.

Figure 3:
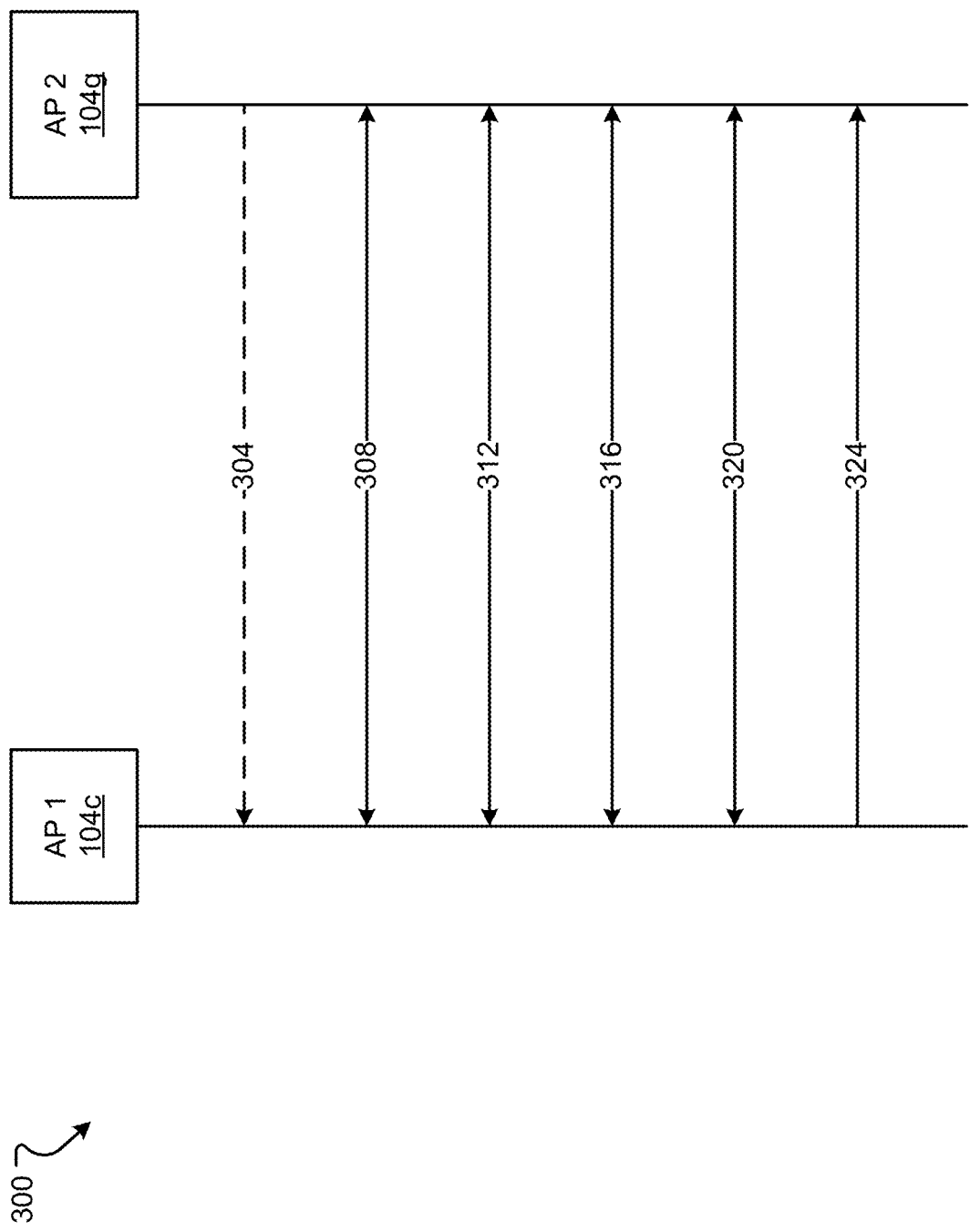
FIG. 3 illustrates a signaling process in accordance with aspects of the current disclosure.

An example signaling process 300 that shows the different, various signals being transmitted between a master AP 104*a* and a slave AP 104*b* may be as shown in FIG. 3. Each of these signals can be transmitted wirelessly or by wired connection. There may be various acknowledgement or control signals that also are sent or provided during signaling process 300 that may not be shown for clarity's sake.

The second AP 104*g* may send a signal 304 during normal operation. This signal 304 may be received by another AP 104*c*, which may be part of a different BSS 100 (see FIG. 1B). From the received signal 304, the first AP 104*c* can determine whether there may be interference when the AP 104*g* sends the signal 304. It is also possible that a station 106 may send signal 304 to the second AP 104*g*, which may also be received and measured by the first AP 104*c*. The first AP 104*c* can determine an RSSI based on the signal and determine if interference may be a problem and collisions can cause a loss of data by the first AP 104*c* and/or the second AP 104*g*.

If interference is possible, the first AP 104*c* may send a handshake agreement to the second AP 104*g* and/or other APs 104 in BSS 100*a* and/or BSS 100*b*, in signal 308. The handshake can be an indication that the first AP 104*a* wishes to do joint OFDMA scheduling between the two BSSs 100*a*, 100*b*. This handshake may be acknowledged by the second AP 104*g*, in the signals 308. Upon a handshake process being completed, the first AP 104*c* and second AP 104*g* may be agreed to conduct joint OFDMA scheduling. Thereinafter, either the first AP 104*c* or the second AP 104*g* may send a time synchronization, in signal 312. This signal 312 indicates the synchronization of the time, possibly using the IEEE 1588 PTP. The time may be sent in such signal 312 from one of the APs 104, and an acknowledgement of the reception of the signal may be sent out from the receiving APs 104.

Thereinafter, the APs 104*c*, 104*g* can agree to a master/slave relationship by exchanging signals 316. Here, one or more of the APs 104 may be selected or may volunteer as a master by sending out a signal 316 with their ID and an indication that the AP 104 will function as the master AP 104. The other APs 104 may recognize the selection or election of this AP 104 as the master by sending another acknowledgement signal, in signals 316. Some of the information that may be exchanged during this master/slave determination, in signals 316, may be as shown in data structure 404 of FIG. 4A. Once the master/slave relationships are determined, the master AP, e.g., AP 104*a*, may then determine an OFDMA schedule.

To determine the OFDMA schedule, the master AP 104*a* may receive or query for information about the load or other characteristics of the current communication environment of the slave APs, e.g., AP 104*b*. This information may be exchanged in signals 320. The characteristics exchanged may be as described in conjunction with data structure 424 of FIG. 4B. The AP characteristics can be received in signal 320 and may then be used to create the OFDMA schedule. The OFDMA schedule may be a RU assignment and may include the data from data structure 456 of FIG. 4C. Then, the OFDMA schedule may be broadcast or sent to one or more of the APs 104, in signals 324. In some situations, the master AP 104*a* can make more than one OFDMA schedule and transmit those separate OFDMA schedules to the various different APs 104 and may address those specific OFDMA schedules to a predetermined, specific AP 104*b*.

Figure 4C:
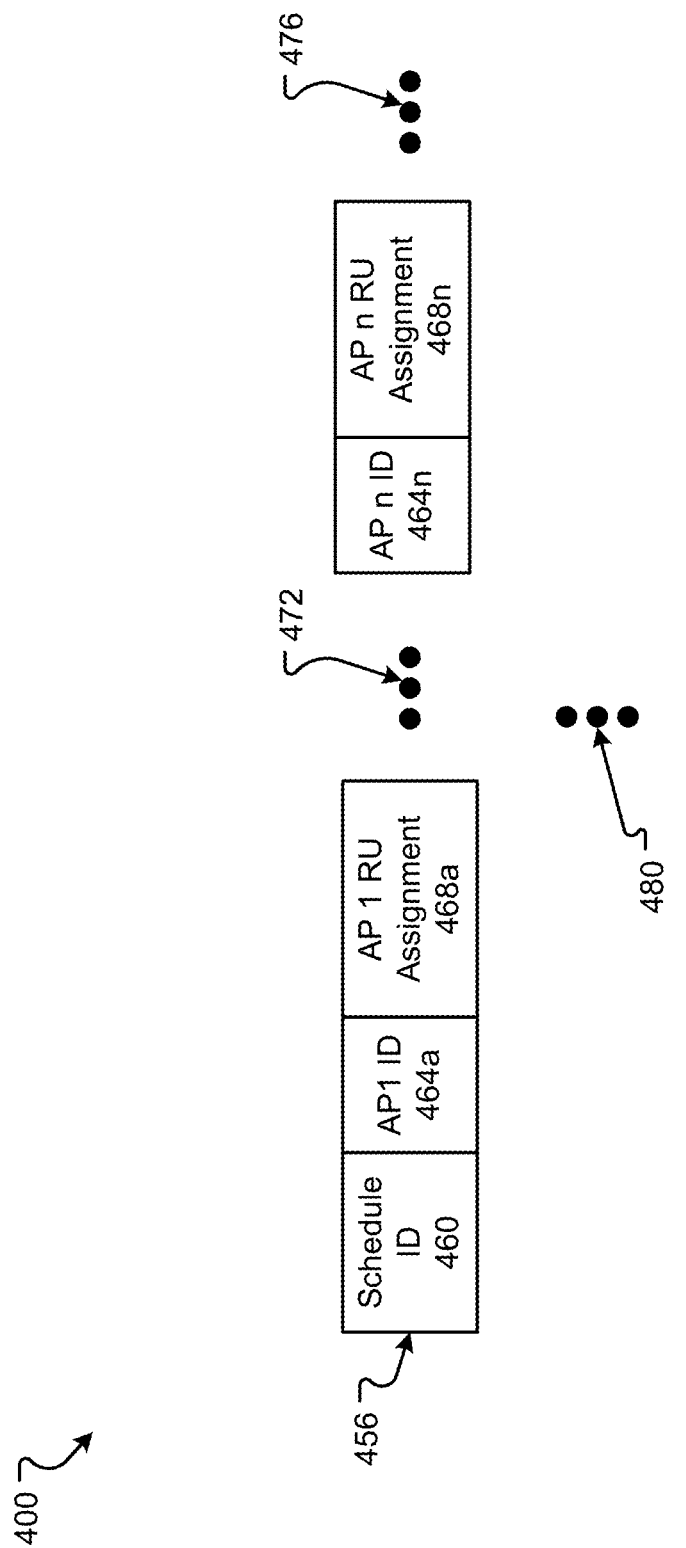
FIG. 4C illustrates another data structure that may be received, stored, retrieved, managed, etc., in accordance with aspects of the current disclosure.

Examples of data structures 400 that may be received, stored, retrieved, sent, managed, etc. in the processes as described herein may be as shown in FIG. 4A through FIG. 4C. The various different data structures 400 can be sent in signals as described in conjunction with FIG. 3. A first data structure 404 that may be exchanged, saved, etc. during determination of the master/slave relationship, in signals 316, may be as shown in FIG. 4A. The data structure 404 can include one or more of, but is not limited, a master identifier (ID) 408, a slave ID 412, etc. There may be more or fewer fields than those shown in FIG. 4A, as represented by ellipses 416. There also may be one or more data structures 404 involved in various different OFDMA schedules as represented by ellipses 420.

The master AP ID 408 can be any type of identifier that identifies AP 104a, as the master AP, for the joint OFDMA scheduling. This master AP ID 408 can include a numeric ID, an alphanumeric ID, a globally unique ID (GUID), a MAC address, a URL, or other types of identifiers. The ID need only identify the master AP 104a amongst the various APs 104 in both the BSSs 100a, 100b.

The slave AP IDs 412 can include similar information to the master AP ID 408 but can indicate which of the APs 104 are slaves in the joint OFDMA scheduling. Thus, the slave AP IDs 412 can be an alphanumeric ID, a numeric ID, a GUID, a MAC address, a URL, etc. The slave AP IDs 412 uniquely identify the APs 104 as slaves amongst other APs 104 in the system. As such, the slave AP IDs 412 can include both an ID of the AP 104b and an indication that AP 104b is a slave. In other situations, the provision of the AP's identifier within the least significant bits of data structure 404 can indicate that that AP 104b is a slave.

An example of a data structure 424 for sending information during a transmission of the AP characteristic signal 320 may be as shown in FIG. 4B. The data structure 424 can include one or more of, but is not limited to, an AP identifier 428, a time stamp 432, an activity information 436, a current RU assignment 440, and/or an OFDMA schedule 444. There may be more or fewer fields in data structure 424 as represented by ellipses 448. Further, every AP 104 sending characteristics to the master AP 104a may include a data structure 424 in signals 320, as represented by ellipses 452.

The AP ID 428 can be similar to the slave ID 412 described in conjunction with FIG. 4A. Thus, the AP ID 428 can include a numeric ID, an alphanumeric ID, a GUID, a MAC address, etc. This AP ID 428 identifies this AP 104b amongst other APs being reviewed or scheduled by the master AP 104a.

The time stamp 432 can include a date and/or time or other information about when the secondary AP 104b sent the data structure 424. As such, the master AP 104a can determine whether the information in data structure 424 is current.

The activity information 436 can include information about the amount of bits or bytes (e.g., the bandwidth used) being sent or received the AP 104 to and/or from one or more stations 106. This activity information 436 can indicate the amount of load on that AP 104b. In this way, the master AP 104a can determine the amount of necessary bandwidth or resources needed for that slave AP 104b.

The current RU assignment 440 can indicate what RU the AP 104b is currently assigned. In this way, the master AP 104a, if possible, can maintain that RU assignment for the slave AP 104b. The RU assignment 440 can indicate the channel and timing of the RU assignment.

The OFDMA schedule 444 can indicate what the current schedule is for that slave AP 104b. Thus, the master AP 104a can determine to what Transmit Opportunity (TXOP), reception requirements, etc. that the AP 104b is currently assigned and may maintain that scheduling if capable. Otherwise, the master AP 104a may change the different RUs and timing of the transmission and/or reception of data for the slave AP 104b.

An example data structure 456 that may include the joint OFDMA schedule may be as shown in FIG. 4C. Data structure 456 can include schedule information for each of the various slave APs 104. As such, data structure 456 can include one or more of, but is not limited to, a schedule identifier 460, a first set of information for a first slave AP, including an AP 1 identifier 464a, and an AP 1 RU assignment 468a, and also a nth set of information for an nth slave AP, including an nth AP n ID 464n, and an nth AP RU assignment 468n. There may be a set of IDs and RU assignments for each of the different slave APs 104 as represented by ellipses 472. There may be more or fewer data fields in data structure 456 as represented by ellipses 476. Further, each separate OFDMA schedule can be sent by the master AP 104 for the slave APs 104, as represented by ellipses 480.

The schedule ID 460 can include any type of identifier that identifies this schedule for the slave APs 104. Thus, the schedule ID 460 can include one or more of, but is not limited to, a numeric ID, an alphanumeric ID, a GUID, etc. This schedule ID 460 can uniquely identify this schedule amongst other schedules previously sent or to be sent by one or more master APs 104a.

Each set of data for the slave APs 104 can include an AP ID 464 and an AP RU assignment 468. The AP ID 464 can include one or more of, but is not limited to, a numeric ID, an alphanumeric ID, a GUID, a MAC address, a URL, or other type of identifier to identify the slave AP 104b. This AP ID may be similar to AP ID 428 or the slave AP ID 412.

The AP RU assignment 468 indicates to the slave AP 104 which RU is being assigned by the master AP 104. This AP RU assignment 468 can include whatever information indicating which of the RU is assigned, including which channel, time for transmission/reception of signals, etc.

Figure 5A:
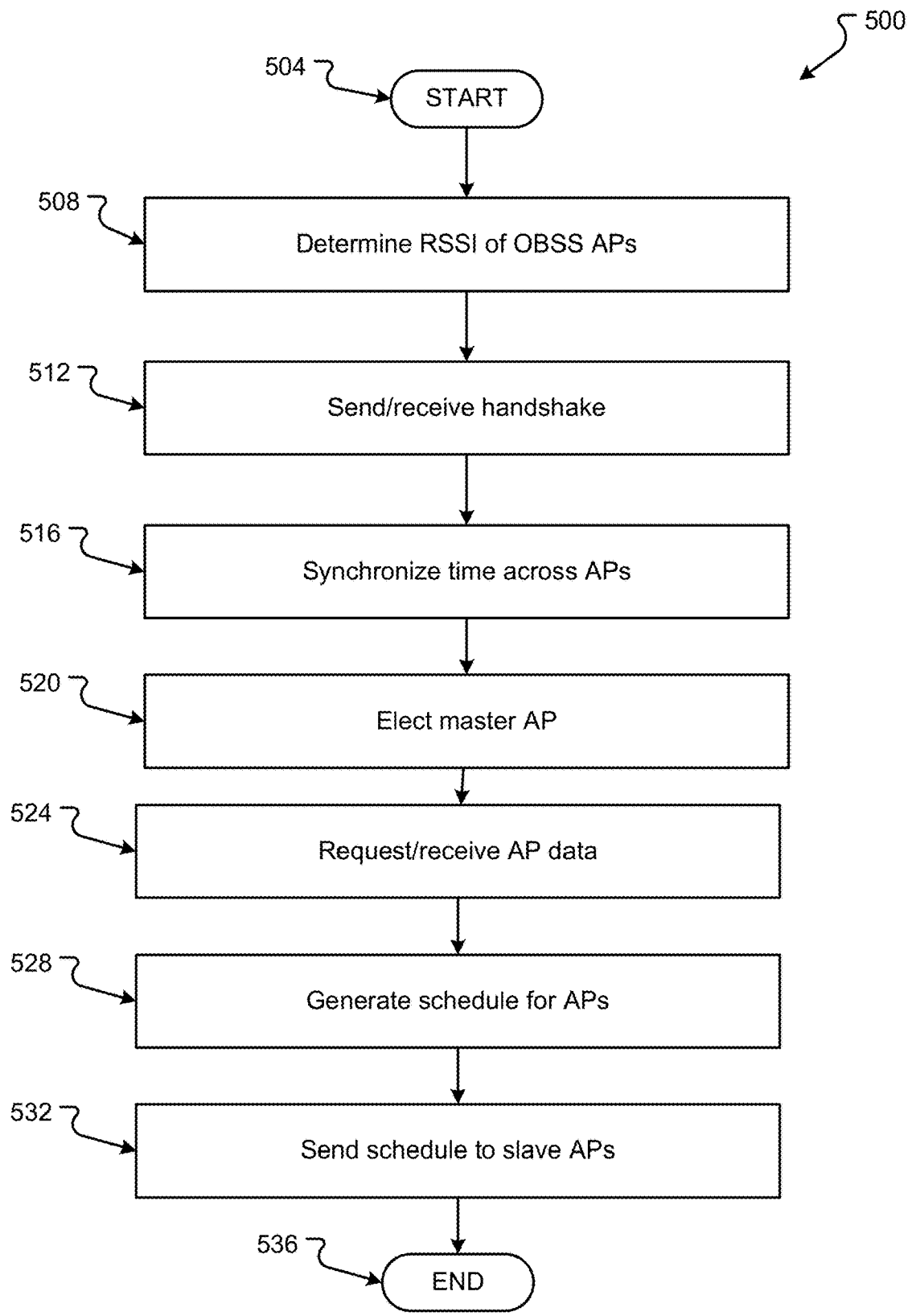
FIG. 5A illustrates a process for managing access to the radio resource, as conducted at a first AP, in accordance with aspects of the current disclosure.
Figure 5B:
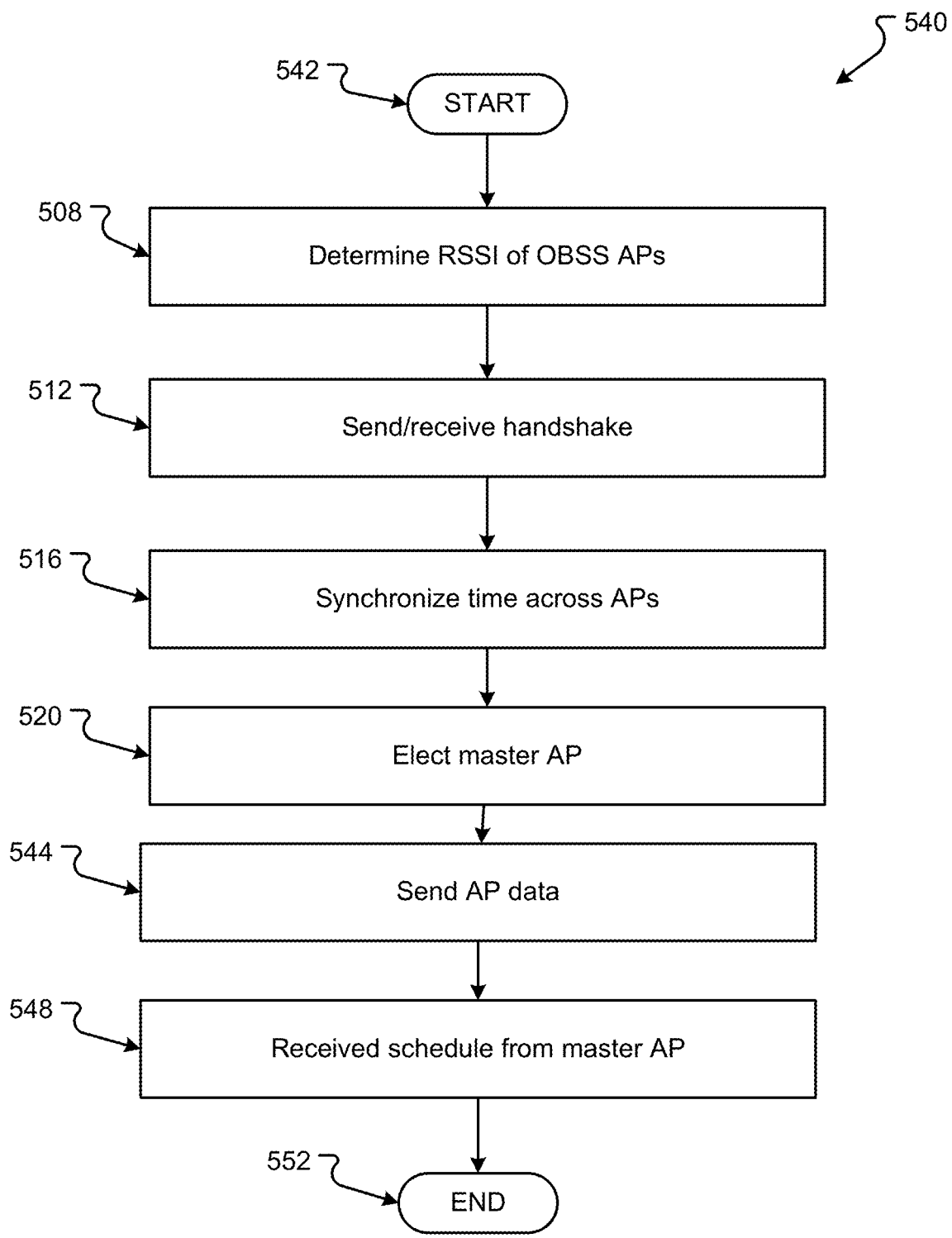
FIG. 5B illustrates a process for managing access to the radio resource, as conducted at a second AP, in accordance with aspects of the current disclosure.

An embodiment of methods 500, 544 processing a joint OFDMA schedule between two or more BSSs 100a, 100b may be as shown in FIGS. 5A and 5B. The method 500 as shown in FIG. 5A may be conducted by a master AP 104a. Generally, the method 500 starts with a start operation 504 and ends with an end operation 536. The method 500 can include more or fewer stages or can arrange the order of the stages differently than those shown in FIG. 5. The method 500 can be executed as a set of computer-executable instructions, executed by a computer system or processing component, and be encoded or stored on a storage medium. Further, the method 500 can be executed by a gate or other hardware device or component in an ASIC, a FPGA, or other type of hardware device. Hereinafter, the method 500 shall be explained with reference to the systems, components, modules, software, data structures, etc. described herein.

The method 540, shown in FIG. 5B, may be conducted by a slave AP 104b. Generally, the method 540 starts with a start operation 542 and ends with an end operation 552. The method 540 can include more or fewer stages or can arrange the order of the stages differently than those shown in FIG. 5. The method 540 can be executed as a set of computer-executable instructions, executed by a computer system or processing component, and be encoded or stored on a storage medium. Further, the method 540 can be executed by a gate or other hardware device or component in an ASIC, a FPGA, or other type of hardware device. Hereinafter, the method 500 shall be explained with reference to the systems, components, modules, software, data structures, etc. described herein. The two methods 500 and 540 will be described in conjunction herein.

Both the AP 104*c* and the AP 104*g* may determine the RSSI of a signal received from another AP 104 of another BSS 100, in stage 508. The interference detector 204, of both the AP 104*c* and the AP 104*g*, may receive a signal 304 from another AP 104 or another station 106. Based on the RSSI determined from the received signal, the interface detector 204 can determine if there is interference from that AP 104 or station 106.

If there is some type of interference, the method proceeds to stage 512 where the AP 104*c* and the 104*g* can send or receive handshake signals 308. Thus, the handshake processor 208 of the APs 104*c*, 104*g* can agree to the handshake in signals 308. After the handshake, the APs 104 have agreed to create a joint OFDMA schedule.

The time synchronizer 212 may then synchronize the time between APs 104 in the two BSSs 100*a*, 100*b*, in stage 516. Here, the master AP 104*c* and slave AP(s) 104*g* can conduct the PTP synchronization process with signals 312. This process ensures that all APs 104 are using the same clock signal. Upon syncing the time across the APs 104, the APs 104 may then elect a master and slave.

The signals 316 can include an election or an assumption of the master/slave relationship, in stage 520. In other words, one of the APs 104 can select or elect the master AP 104*c*. This master/slave information may be broadcast to the other APs in the various BSSs 100. The master AP 104*c* may then store and/or send out the data structure 404 with the AP's 104*c* ID in the master ID field 408 and then the place the IDs of rest of the APs in the slave IDs field(s) 412. Upon completing the handshake process, the two BSSs 100*a*, 100*b* may conduct other processes to create a joint OFDMA schedule.

The master AP 104*c* may then request or receive data from the slave AP(s) 104*g*, in stage 524. The request for the data may be sent from the AP interface analysis component 220. The slave AP 104*g* then may receive this request at the AP interface 220 of the AP 104*g*. The request may then be responded to by sending various data, as in data structure 424, in a signal 320 to the master AP 104*c*, in stage 544. The master AP 104*c* can receive the data from the slave AP 104*g*, in stage 524.

The master AP 104*c* may then use the AP interface analysis component 220 to analyze the information in data structure 424 from each of the various slave APs 104. This analysis may then be provided to the RU assignor 224.

The RU assignor 224 can then generate a shared OFDMA schedule, in stage 528. Here, the RU assignor 224 can analyze the information from the various slave APs 104 to determine a best schedule for one or more of the APs 104 in both BSSs 100*a*, 100*b*. This new schedule may be incorporated into data structure 456 that indicates what RUs each of the various APs 104 is assigned. This schedule may then be sent, by the AP interface 220, to each of the different slave APs 104*g*, in stage 532. The slave APs 104*g* can then receive this schedule from master AP 104*c*, in stage 548.

The slave APs 104*g* may then apply the schedule by electing to send (or receive) data in the RUs scheduled by the master AP 104*c*. It should be noted, the slave AP 104*g* need not follow the schedule if not desired. This may cause interference issues, but may work better for the schedule of the slave AP 104*g*. In some situations, the master AP 104*c* sends more than one OFDMA schedule based on whether that particular slave AP 104*g* may have interference issues.

Thus, if a slave AP 104*g* is at a far edge of the BSS 100*b*, for example AP 104*d*, then that AP need not concern itself with interference from the first BSS 100*a* and thus may use the same resource units as other APs 104 in the other BSS 100*a*.

FIG. 6 illustrates an embodiment of a communications device 600 that may implement one or more of APs 104, controllers 101, and/or STAs 106 of FIG. 1. In various embodiments, device 600 may comprise a logic circuit. The logic circuit may include physical circuits to perform operations described for one or more of APs 104, controllers 101, and STAs of FIG. 1, for example. As shown in FIG. 6, device 600 may include one or more of, but is not limited to, a radio interface 610, baseband circuitry 620, and/or computing platform 630.

The device 600 may implement some or all of the structures and/or operations for one or more of APs 104, controllers 101, and/or STAs 106 of FIG. 1, storage medium 660, and logic circuit in a single computing entity, such as entirely within a single device. Alternatively, the device 600 may distribute portions of the structure and/or operations using a distributed system architecture, such as a client-server architecture, a peer-to-peer architecture, a master-slave architecture, etc.

An radio interface 610, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-air interface or modulation scheme. The radio interface 610 may include, for example, a receiver 612 and/or a transmitter 616. Radio interface 610 may include bias controls, a crystal oscillator, and/or one or more antennas 618. In additional or alternative configurations, the radio interface 610 may use oscillators and/or one or more filters, as desired.

Baseband circuitry 620 may communicate with radio interface 610 to process, receive, and/or transmit signals and may include, for example, an Analog-To-Digital Converter (ADC) for down converting received signals with a Digital-To-Analog Converter (DAC) 622 for up converting signals for transmission. Further, baseband circuitry 620 may include a baseband or PHYsical layer (PHY) processing circuit for the PHY link layer processing of respective receive/transmit signals. Baseband circuitry 620 may include, for example, a Medium Access Control (MAC) processing circuit 627 for MAC/data link layer processing. Baseband circuitry 620 may include a memory controller for communicating with MAC processing circuit 627 and/or a computing platform 630, for example, via one or more interfaces 634.

In some configurations, PHY processing circuit may include a frame construction and/or detection module, in combination with additional circuitry such as a buffer memory, to construct and/or deconstruct communication frames. Alternatively or in addition, MAC processing circuit 627 may share processing for certain of these functions or perform these processes independent of PHY processing circuit. In some configurations, MAC and PHY processing may be integrated into a single circuit.

The computing platform 630 may provide computing functionality for the device 600. As shown, the computing platform 630 may include a processing component 628. In addition to, or alternatively of, the baseband circuitry 620, the device 600 may execute processing operations or logic for one or more of APs 104, controllers 101, and/or STAs 106, storage medium 660, and logic circuits using the memory components 660. The processing component 628 (and/or PHY and/or MAC 627) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, Application Program Interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 630 may further include other platform components. Other platform components include common computing elements, such as one or more processors, multi-core processors, co-processors, memory units, chipsets, controllers, peripherals, interfaces, oscillators, timing devices, video cards, audio cards, multimedia Input/Output (I/O) components (e.g., digital displays), power supplies, and so forth. Examples of memory units 660 may include without limitation various types of computer readable and machine readable storage media in the form of one or more higher speed memory units, such as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory, polymer memory such as ferroelectric polymer memory, ovonic memory, phase change or ferroelectric memory, Silicon-Oxide-Nitride-Oxide-Silicon (SONOS) memory, magnetic or optical cards, an array of devices such as Redundant Array of Independent Disks (RAID) drives, solid state memory devices (e.g., Universal Serial Bus (USB) memory, Solid State Drives (SSD) and any other type of storage media suitable for storing information.

Device 600 may be, for example, an ultra-mobile device, a mobile device, a fixed device, a Machine-To-Machine (M2M) device, a Personal Digital Assistant (PDA), a mobile computing device, a smart phone, a telephone, a digital telephone, a cellular telephone, user equipment, eBook readers, a handset, a one-way pager, a two-way pager, a messaging device, a computer, a Personal Computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 600 described herein, may be included or omitted in various embodiments of device 600, as suitably desired.

Embodiments of device 600 may be implemented using Single Input Single Output (SISO) architectures. However, certain implementations may include multiple antennas (e.g., antennas 618) for transmission and/or reception using adaptive antenna techniques for beamforming or Spatial Division Multiple Access (SDMA) and/or using MIMO communication techniques.

The components and features of device 600 may be implemented using any combination of discrete circuitry, Application Specific Integrated Circuits (ASICs), logic gates and/or single chip architectures. Further, the features of device 600 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 6 can also contain a security module (not shown). This security module can contain information regarding, but not limited to, security parameters required to connect the device to another device or other available networks or network devices, and can include Wireless Equivalent Privacy (WEP) or Wi-Fi Protected Access (WPA) security access keys, network keys, etc., as discussed.

Another module that the device in FIG. 6 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 627. The network access unit can also work and interact with one or more of the modules/components described herein.

It should be appreciated that the exemplary device 600 shown in the block diagram of FIG. 6 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Aspects of the disclosure comprise a method comprising: receiving, at a first Access Point (AP) of a first Basic Service Set (BSS), a signal from a second AP of a second BSS; determining, by the first AP, a Received Signal Strength Indicator (RSSI) associated with the second AP to determine if there is interference from the second AP; when there is interference, generating a joint schedule for the first AP and the second AP to manage how the first AP and second AP transmit or receive signals to mitigate the interference.

Any of the one or more above aspects, wherein the first AP and the second AP exchange an agreement to conduct joint scheduling.

Any of the one or more above aspects, wherein the agreement is a handshake signal.

Any of the one or more above aspects, wherein the first AP and the second AP elect the first AP as a master AP to generate the joint schedule.

Any of the one or more above aspects, wherein the second AP is a slave AP.

Any of the one or more above aspects, wherein the first AP and the second AP synchronize timing before following the joint schedule.

Any of the one or more above aspects, wherein the timing is synchronized using a Precision Time Protocol.

Any of the one or more above aspects, wherein the first AP receives data associated with the second AP to generate the joint schedule.

Any of the one or more above aspects, wherein the data associated with the second AP comprises one or more of an amount of activity at the second AP, a current resource unit (RU) assigned to the second AP, and/or an orthogonal frequency-division multiple access (OFDMA) schedule being followed by the second AP.

Any of the one or more above aspects, wherein the joint schedule provides an RU in which the second AP is to transmit or receive data.

Aspects of the disclosure further comprise an access point (AP) comprising: a radio operable to receive a signal from a second AP of a second Basic Service Set (BSS); a memory; a processor in communication with the memory and the radio, the processor operable to: determine a Received Signal Strength Indicator (RSSI) associated with the second AP to determine if there is interference from the second AP; when there is interference: send a handshake signal to the second AP as an agreement to conduct joint scheduling; and generate a joint schedule for the AP and the second AP to manage how the AP and second AP transmit or receive signals to mitigate the interference.

Any of the one or more above aspects, wherein the AP and the second AP elect the AP as a master AP to generate the joint schedule, and wherein the second AP is a slave AP.

Any of the one or more above aspects, wherein the AP and the second AP synchronize timing before following the joint schedule, and wherein the timing is synchronized using a Precision Time Protocol.

Any of the one or more above aspects, wherein the AP receives data associated with the second AP to generate the joint schedule, and wherein the data associated with the second AP comprises one or more of an amount of activity at the second AP, a current resource unit (RU) assigned to the second AP, and/or an orthogonal frequency-division multiple access (OFDMA) schedule being followed by the second AP.

Any of the one or more above aspects, wherein the joint schedule provides an RU in which the second AP is to transmit or receive data.

Aspects of the disclosure further comprise a basic service set comprising: a first access point operable to: receive a signal from a second AP of a second Basic Service Set (BSS); determine a Received Signal Strength Indicator (RSSI) associated with the second AP to determine if there is interference from the second AP; when there is interference: send a handshake signal to the second AP as an agreement to conduct joint scheduling; and generate a joint schedule for the AP and the second AP to manage how the AP and second AP transmit or receive signals to mitigate the interference.

Any of the one or more above aspects, wherein the AP and the second AP elect the AP as a master AP to generate the joint schedule, and wherein the second AP is a slave AP.

Any of the one or more above aspects, wherein the AP and the second AP synchronize timing before following the joint schedule, and wherein the timing is synchronized using a Precision Time Protocol.

Any of the one or more above aspects, wherein the AP receives data associated with the second AP to generate the joint schedule, and wherein the data associated with the second AP comprises one or more of an amount of activity at the second AP, a current resource unit (RU) assigned to the second AP, and/or an orthogonal frequency-division multiple access (OFDMA) schedule being followed by the second AP.

Any of the one or more above aspects, wherein the joint schedule provides an RU in which the second AP is to transmit or receive data.

What is claimed is:

1. A method comprising:
receiving, at a first Access Point (AP) of a first Basic Service Set (BSS), a signal from a second AP of a second BSS;
determining, by the first AP, a Received Signal Strength Indicator (RSSI) associated with the second AP to determine if there is interference from the second AP; and
when there is interference, generating a joint schedule for the first AP and the second AP to manage how the first AP and second AP transmit or receive signals to mitigate the interference, wherein the first AP and the second AP exchange an agreement comprising a handshake signal to conduct joint scheduling, wherein the first AP and the second AP elect the first AP as a master AP to generate the joint schedule, wherein the second AP is a slave AP, wherein the first AP and the second AP synchronize timing using a Precision Time Protocol before following the joint schedule, wherein the first AP receives data associated with the second AP to generate the joint schedule, wherein the data associated with the second AP comprises one or more of an amount of activity at the second AP, a current resource unit (RU) assigned to the second AP, and/or an orthogonal frequency-division multiple access (OFDMA) schedule being followed by the second AP.

2. The method of claim 1, wherein the joint schedule provides an RU in which the second AP is to transmit or receive data.

3. A access point (AP) comprising:
a radio operable to receive a signal from a second AP of a second Basic Service Set (BSS);
a memory;
a processor in communication with the memory and the radio, the processor operable to:
determine a Received Signal Strength Indicator (RSSI) associated with the second AP to determine if there is interference from the second AP;
when there is interference:
send a handshake signal to the second AP as an agreement to conduct joint scheduling; and
generate a joint schedule for the AP and the second AP to manage how the AP and second AP transmit or receive signals to mitigate the interference, wherein the AP receives data associated with the second AP to generate the joint schedule, and wherein the data associated with the second AP comprises one or more of an amount of activity at the second AP, a current resource unit (RU) assigned to the second AP, and/or an orthogonal frequency-division multiple access (OFDMA) schedule being followed by the second AP.

4. The AP of claim 3, wherein the AP and the second AP elect the AP as a master AP to generate the joint schedule, and wherein the second AP is a slave AP.

5. The AP of claim 3, wherein the AP and the second AP synchronize timing before following the joint schedule, and wherein the timing is synchronized using a Precision Time Protocol.

6. The AP of claim 3, wherein the joint schedule provides an RU in which the second AP is to transmit or receive data.

7. A basic service set comprising:
a first access point operable to:
receive a signal from a second AP of a second Basic Service Set (BSS);
determine a Received Signal Strength Indicator (RSSI) associated with the second AP to determine if there is interference from the second AP;
when there is interference:
send a handshake signal to the second AP as an agreement to conduct joint scheduling; and
generate a joint schedule for the AP and the second AP to manage how the AP and second AP transmit or receive signals to mitigate the interference, wherein the joint schedule provides an RU in which the second AP is to transmit or receive data.

8. The basic service set of claim 7, wherein the AP and the second AP elect the AP as a master AP to generate the joint schedule, and wherein the second AP is a slave AP.

9. The basic service set of claim 8, wherein the AP and the second AP synchronize timing before following the joint schedule, and wherein the timing is synchronized using a Precision Time Protocol.

10. The basic service set of claim 9, wherein the AP receives data associated with the second AP to generate the joint schedule, and wherein the data associated with the second AP comprises one or more of an amount of activity at the second AP, a current resource unit (RU) assigned to the second AP, and/or an orthogonal frequency-division multiple access (OFDMA) schedule being followed by the second AP.

* * * * *